United States Patent [19]

Lafferty, Sr.

[11] 4,075,523
[45] Feb. 21, 1978

[54] PLUG-IN BRUSH CARTRIDGE

[75] Inventor: Gary S. Lafferty, Sr., Franklin, Wis.

[73] Assignee: Milwaukee Electric Tool Corporation, Brookfield, Wis.

[21] Appl. No.: 609,237

[22] Filed: Sept. 2, 1975

[51] Int. Cl.$^2$ ............................................. H02K 13/00
[52] U.S. Cl. .................................................... 310/239
[58] Field of Search .............. 310/239, 240, 241, 242, 310/244, 245, 246, 247, 47, 50, 42; 51/170; 200/157; 173/93.6; 279/99; 408/239

[56] References Cited

U.S. PATENT DOCUMENTS

| | | | |
|---|---|---|---|
| 2,430,422 | 11/1947 | Happe | 310/50 |
| 2,456,571 | 12/1948 | Turner | 310/50 |
| 3,135,887 | 6/1964 | Schaffan | 310/42 |
| 3,329,844 | 7/1967 | Happe | 310/239 |
| 3,387,155 | 6/1968 | Krulls | 310/239 |
| 3,391,290 | 7/1968 | Hahndorf | 310/42 |
| 3,445,693 | 5/1969 | Crawshaw | 310/42 |
| 3,462,623 | 8/1969 | Batson | 310/50 |
| 3,842,302 | 10/1974 | Apostoleris | 310/239 |
| 3,867,659 | 2/1975 | Seaburg | 310/242 |

FOREIGN PATENT DOCUMENTS

| | | | |
|---|---|---|---|
| 947,405 | 6/1956 | Germany | 310/239 |

*Primary Examiner*—R. Skudy

[57] ABSTRACT

A cartridge, on which is mounted two active carbon brush assemblies, plugs into a specially designed opening in one side of a motor housing of a power operated tool. As the cartridge is inserted or removed, electric terminals mounted on the cartridge connect with or disconnect from terminals fixed on the motor housing to automatically establish or disconnect the electrical connections for controlling the motor operation. A single non-metallic screw holds the cartridge with both active brush assemblies in operative position within the opening with the active carbon brushes in juxtaposition and engageable with the commutator of the motor at diametrically opposed positions. The opening in the motor housing has an integral support therein. Such support also provides ramps to guide the carbon brushes up and onto diametrically opposite sides of the motor's commutator as the cartridge is plugged into the opening. The cartridge has recesses to removably mount a spare non-metallic screw and a pair of spare carbon brushes in a manner to prevent damage due to operating vibration and casual droppage of the tool. The shape of the outer surface of the cartridge is designed to conform to the shape of the outside of the motor housing.

7 Claims, 4 Drawing Figures

PLUG-IN BRUSH CARTRIDGE

BACKGROUND OF THE INVENTION

1. Field of the Invention

This invention relates to a plug-in cartridge with active carbon brushes for commutator type motors, particularly such a cartridge which permits easy and safe replacement of worn active carbon brushes. Another object of this invention is to provide such a cartridge which is economical to manufacture.

2. Description of the Prior Art

Non-metallic pistol handle type power tools make easy access to active carbon brushes virtually impossible as it is usually necessary to partially dissemble the tool to gain access to at least one of the brushes. An example is "The Care and Operation" manuals distributed by Milwaukee Electric Tool Corporation, the assignee of this application, identified as 58-12-0840 and 58-12-0675. The first of these manuals states that the second brush "can be exposed by removing the six screws which secures the right side of the pistol grip". It appears to be necessary to "liftout trigger switch assembly and remove lower brush cap". However, the second manual makes it clear that with aluminum handle type drills both brushes may be individually and separately removed without disassembling the body for the motor.

When the brushes are mounted in the housing of power tools with metal pistol handles or in metal bell housings of conventional electric motors, each of the two brush holders and carbon brushes may be separately and individually removed. For examples, see the following U.S. Pat. Nos:

1,443,499:
2,372,660:
3,162,782:
3,362,111:
3,369,615:
3,381,104:
3,441,766:
3,450,917:
3,489,191:
3,513,343:
3,617,786.

The results of a patentability search did not uncover any patent which disclosed a plug-in cartridge which carried both of two actice brushes positioned to engage the motor commutator at diametrically opposite positions. U.S. Pat. No. 1,443,499 appears to disclose a non-plug-in type cartridge carrying two brushes. U.S. Pat. No. 3,496,394 also discloses a non-plug-in type cartridge carrying two brushes. Perhaps the most pertinent disclosure pertaining to a plug-in cartridge is U.S. Pat. No. 3,387,155. However, the brushes carried by such cartridge do not engage the commutator at diametrically opposite positions.

Another prior art recently known to applicant is U.S. Pat. No. 3,813,567. This patent shows and describes a carbon holder 9 seated on the outer end of a casing 8 (see FIG. 2). The holder 9 and two brushes 15 mounted on it can be removed after the removal of a housing cover 12 and its plurality of holding screws 11. The removal of the cover 12 also withdraws the rotor 13. Hence, when the brush holder is removed, the brushes 15 are not removed from the commutator. There is no description of how the brushes 15 are held retracted when the rotor 13 with its commutator is axially removed with the cover 12. Thus, this patent does not disclose a plug-in cartridge.

SUMMARY OF THE INVENTION

This invention is directed to a novel plug-in cartridge with two active brushes which cartridge is fitted into a special recess in one side of the motor housing of a power tool or other like device. When being plugged in or removed, the cartridge automatially makes electric contact with the motor control electrical system. When plugged in, the shape of the outer surface of the cartridge closely conforms to the shape of the outer surface of the motor housing or pistol type handle. Additional features are: the provision of a storage space for replacement brushes; ramps for directing both active brushes onto diametrically opposite sides of the commutator upon insertion of the cartridge; and storage space for a replacement non-metallic holding screw.

DESCRIPTION OF THE PREFERRED EMBODIMENT

Figure 1:
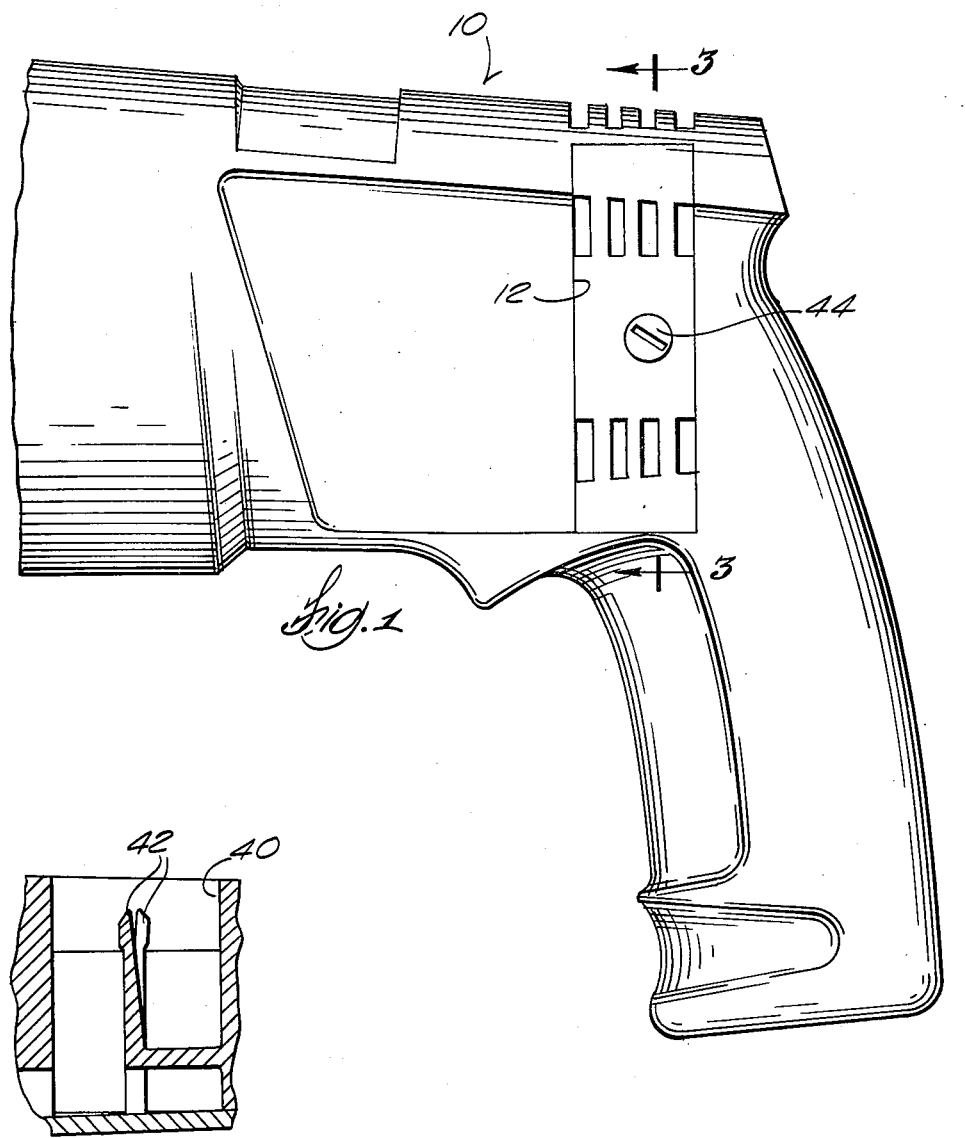
FIG. 1 is a view in side elevation of the handle portion of a portable drill with the plug-in cartridge embodying the present invention shown in place.

Referring to the drawings by reference numerals, the invention is shown installed in the motor housing 10 of a power operated drill of conventional well-known design, (see FIG. 1 of U.S. Pat. No. 3,834,252) the gear casing and output mechanism being omitted as they are not essential to an understanding of the present invention.

Figure 3:
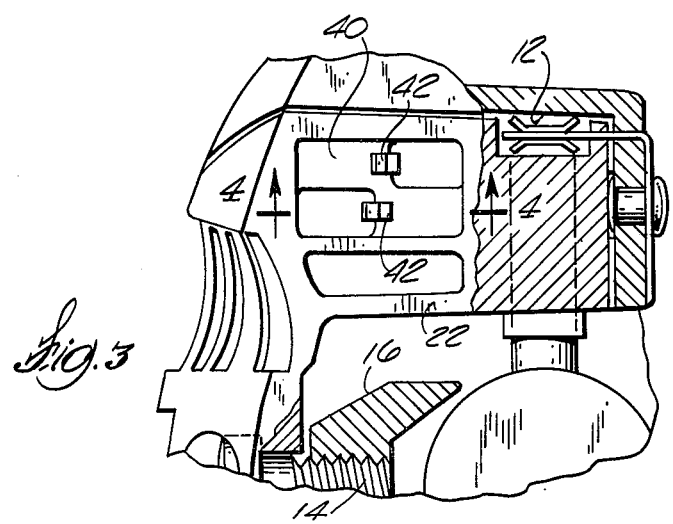
FIG. 3 is a fragmentary sectional view taken on the line 3—3 of FIG. 1 with part of the plug-in cartridge shown in side elevation.

The motor housing 10 has a plug-in cartridge receiving opening 12 in only one side of such housing. The interior of the opening 12 is formed as shown in FIG. 3 and includes a support member 14 which provides two oppositely positioned ramp-like surfaces 16 for the purpose of guiding active carbon brushes 26 carried by the plug-in cartridge onto diametrically opposite places of the commutator of the electric motor. Since the motor and its commutator and their mounting within the motor housing are well known, there is no showing of such in the drawings. It is only essential that the opening 12 be in juxtaposition to the commutator and that there be male terminals 18 fixedly mounted so as to project onto the opening 12.

Figure 4:
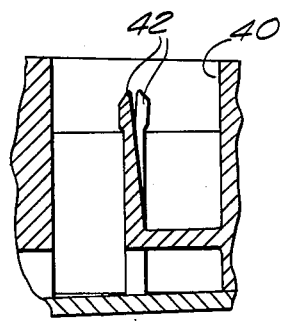
FIG. 4 is a fragmentary sectional view of the holding area for removably carrying replacement carbon brushes taken on the line 4—4 of FIG. 3.
Figure 2:
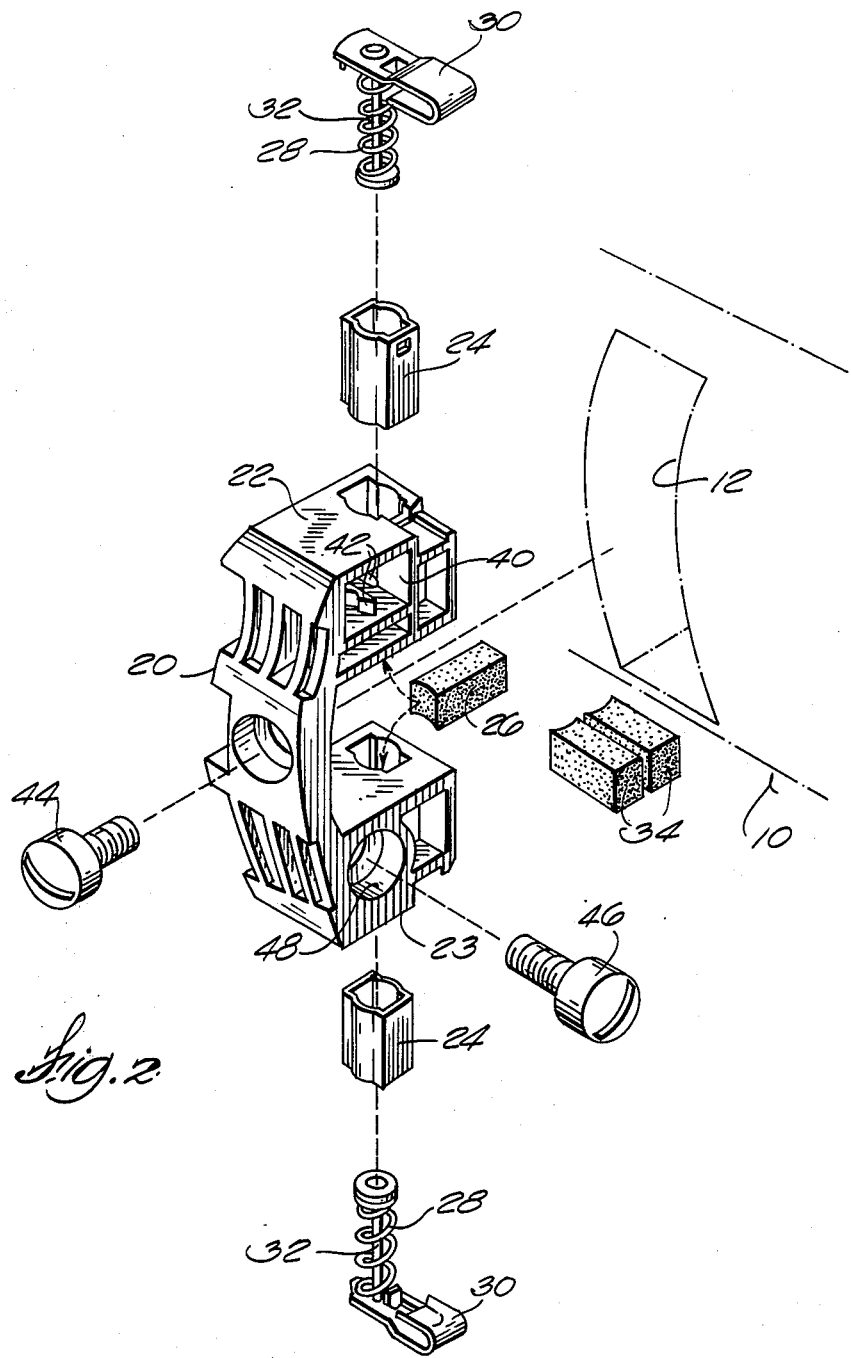
FIG. 2 is an exploded perspective view of the plug-in cartridge and brush assemblies embodying the present invention.

The plug-in cartridge, see FIGS. 2 and 4, has a main body 20 and two legs 22 and 23. The legs 22 and 23 provide support for the brush inserts 24, each insert having an active carbon brush 26 urged toward the commutator by a compression spring 28. Female terminals 30 are secured to the brush inserts 24 and are electrically connected through conventional pigtails or shunts 32 to the carbon brushes 26. In practice, the brush inserts 24 are provided with abutments (not shown) which hold the spring 28 and shunt 32 within the inserts 24 and also limit the inward advance of the carbon brushes 26 so that contact between such brushes and the commutator will break and stop motor activation before the carbon brushes are too worn, thus forcing a replacement of worn active carbon brushes.

A feature of this invention is the provision of means to replace the worn active carbon brushes 26 with spare new carbon brushes 34. As shown in FIGS. 2 and 4, there is provided in the leg 22 a brush receiving opening 40 for the two spare carbon brushes 34. The opening 40 is divided into two sections, one for each replacement brush. Between these sections are two integral flexible fingers 42, oppositely biased. These fingers function to flexibly hold each spare brush 34 against undue and damaging vibration and thus prevent their disintegration.

As can be seen in FIGS. 1 and 2, a single nonmetallic holding screw 44 is rotatably held within an opening in the main body 20 of the plug-in cartridge. This is threaded into a threaded opening in the support member 14 (see FIG. 3) to hold the plug-in cartridge within the opening 12. Since this holding screw is non-metallic, it is subject to damage or destruction, thus it is preferable to provide a spare non-metallic holding screw 46 which is removably frictionally held in a spare screw holding opening 48 in the leg 23 of the cartridge. The holding opening 48 extends through such leg so that the spare screw 46 may be readily pushed out from such opening when needed.

I claim:

1. A plug-in cartridge adapted for insertion into a cartridge receiving opening in only one side of a motor housing forming part of a pistol handle type of power tool and containing an electric motor and its commutator for a power operated tool comprising:
    (a) a motor housing having a cartridge receiving opening in one side thereof in juxtaposition to the commutator on the electric motor;
    (b) a plug-in cartridge slidably received and seated in said cartridge receiving opening, said cartridge supporting at least two carbon brush assemblies each having an active carbon brush, said brushes being positioned to slide radially onto and engage the commutator from diametrically opposed positions; and
    (c) terminal means in said opening and on said plug-in cartridge adapted to make and break electrical contacts as said cartridge is moved into or out of said opening.

2. A plug-in cartridge and motor housing combination as defined in claim 1 in which the outer surface of said cartridge conforms in shape to the outer surface of said motor housing when said cartridge is fully seated in said opening.

3. A plug-in cartridge as defined in claim 1 which has a brush receiving opening for at least two spare carbon brushes as replacement for worn active brushes in said carbon brush assemblies.

4. A plug-in cartridge as defined in claim 3 in which there are resilient means in said brush receiving opening to frictionally mount and hold said spare carbon brushes so as to resist damage to said spare carbon brushes from vibration and jarring.

5. A plug-in cartridge and motor housing combination as defined in claim 1 in which there is a support within said cartridge receiving opening providing oppositely positioned ramp-like surfaces to guide the active carbon brushes in said brush assemblies radially onto the commutator of the electric motor.

6. A plug-in cartridge and motor housing combination as defined in claim 5 in which a single non-metallic holding screw is threaded into an opening in said support to maintain said cartridge in seated position.

7. A plug-in brush cartridge as defined in claim 6 in which there is a screw receiving opening for a spare nonmetallic holding screw.

* * * * *